(12) United States Patent
Bodell et al.

(10) Patent No.: US 11,069,164 B2
(45) Date of Patent: Jul. 20, 2021

(54) SYSTEM FOR MANAGING MOBILE DEVICES

(71) Applicant: VIZpin, Inc., Lancaster, PA (US)

(72) Inventors: Paul Bodell, Lancaster, PA (US); Rosco Schock, Lancaster, PA (US); Peter Dikeman, Cotuit, MA (US)

(73) Assignee: VIZpin, Inc., Lancaster, PA (US)

( * ) Notice: Subject to any disclaimer, the term of this patent is extended or adjusted under 35 U.S.C. 154(b) by 127 days.

(21) Appl. No.: 16/358,157

(22) Filed: Mar. 19, 2019

(65) Prior Publication Data

US 2019/0295344 A1 Sep. 26, 2019

Related U.S. Application Data

(60) Provisional application No. 62/645,285, filed on Mar. 20, 2018.

(51) Int. Cl.
*G07C 9/00* (2020.01)
*H04W 12/06* (2021.01)
*G07C 9/28* (2020.01)

(52) U.S. Cl.
CPC .......... *G07C 9/00309* (2013.01); *G07C 9/28* (2020.01); *H04W 12/06* (2013.01); *G07C 2009/00396* (2013.01)

(58) Field of Classification Search
None
See application file for complete search history.

(56) References Cited

U.S. PATENT DOCUMENTS

| | | | |
|---|---|---|---|
| 8,646,060 B1 * | 2/2014 | Ben Ayed | H04L 63/205 726/9 |
| 9,666,000 B1 * | 5/2017 | Schoenfelder | G07C 9/28 |
| 10,769,877 B2 * | 9/2020 | Kaye | H04W 64/00 |
| 2012/0280790 A1 * | 11/2012 | Gerhardt | G07C 9/00571 340/5.61 |
| 2016/0098874 A1 * | 4/2016 | Handville | G07C 9/00658 340/5.61 |

* cited by examiner

*Primary Examiner* — Carlos Garcia
(74) *Attorney, Agent, or Firm* — Iandiorio Teska & Coleman, LLP

(57) ABSTRACT

A mobile device verification method for a facility includes the mobile device requesting authorization to permit entry to and/or exit from the facility, validating the mobile device request, and verifying, as a mobile device enters and exits the facility, that the mobile device is the mobile device whose authorization request was validated.

11 Claims, 11 Drawing Sheets

Supervised Entry/Exit

Supervised Entry/Exit

Mobile Device

Authorization Device

Location Device

Automated Authorization Device

Server Grant Location Key

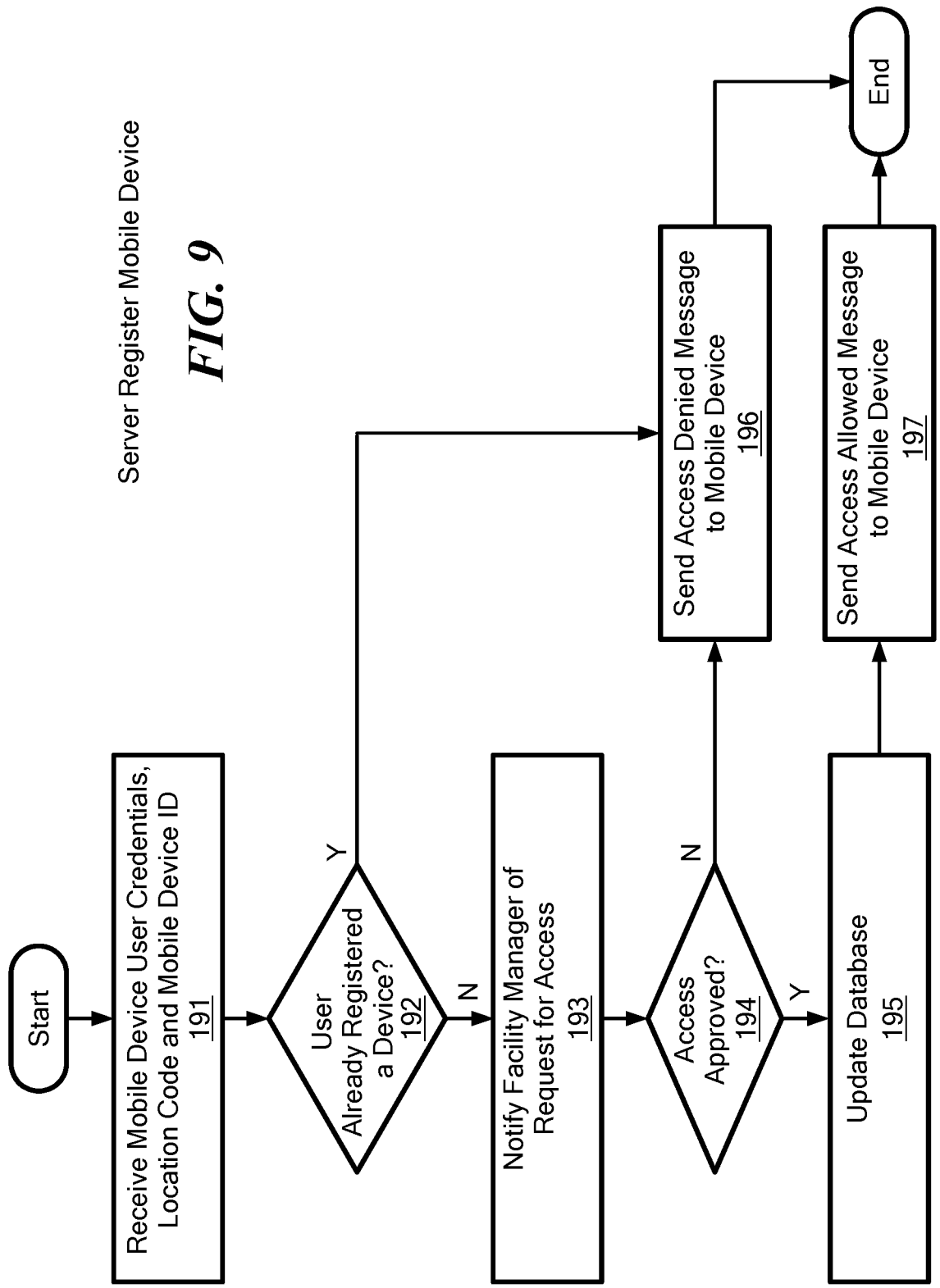

Mobile Device
Device Registration

SYSTEM FOR MANAGING MOBILE DEVICES

RELATED APPLICATIONS

This application claims benefit of and priority to U.S. Provisional Application Ser. No. 62/645,285 filed Mar. 20, 2018, under 35 U.S.C. §§ 119, 120, 363, 365, and 37 C.F.R. § 1.55 and § 1.78, which is incorporated herein by this reference.

FIELD OF THE INVENTION

This subject invention relates to authorization and anti-theft systems and methods.

BACKGROUND OF THE INVENTION

The ubiquity of mobile devices has created a number of challenges to their use in various types of facilities. Their small size and high value make them an attractive target for theft. In addition, their powerful computing, large data storage, data communication image and audio capture capabilities pose a potential threat to security and or privacy in many settings.

In the shipping and warehousing logistics industry, losses due to employee theft of mobile devices is a rising concern. Mobile devices pose a unique set of problems relating to theft in these locations. The devices small size and high value make them an attractive target. Due to their common form-factor, packages containing mobile devices can typically be identified, even with unlabeled packaging. Most employees are carrying personal phones that are very similar or nearly identical to the target merchandise. Employees can activate stolen devices with an existing SIM card and claim the device is their personal property.

Also, organizations that deal with sensitive data or deal confidentially with clients may have a need to control who may bring a mobile device into a facility or a secure/private area of a facility. The capabilities and small size of mobile devices make them a powerful tool for those seeking to steal sensitive data or compromise the privacy of others. For example, mobile devices can be used to surreptitiously capture audio, video, or still images that are then transmitted to a third party and/or stored on the device for later retrieval. The powerful capabilities of mobile devices also make them an ideal tool for the hacking or "eavesdropping" on the internal systems of a facility.

Some employees may refuse to work in a facility where they are not authorized to carry their personal devices. Employer/facility managers need to prevent loss due to theft of mobile devices and/or protect sensitive data and the privacy of employees/clients, while still allowing authorized persons to carry their personal devices.

Security/loss prevention officers need to be able to quickly validate that the phone an individual is carrying actually belongs to them, and that they have been authorized to carry it within the facility.

One existing solution to the problem is as follows. The Loss Prevention department maintains a list of authorized employee devices and a collection of color-coded authorization stickers.

Upon arrival to the facility, each employee presents their mobile device, unlocked, to the Loss Prevention Officer (LPO). The LPO records the employee's name, phone number, facility credentials, mobile device make and model, and the mobile device IMEI number. Once all this information is recorded, a sticker, coded for the day, is placed on the authorized device, and the employee is allowed to enter the facility.

Prior to exiting the facility, employees are required to show their mobile device, and the sticker is checked to verify that the device has been authorized for the day. By a process of random selection, a percentage of employees are selected for thorough validation; the selected employee is then required to unlock their phone, and the LPO will recover the employee record, and validate that the phone number, and the IMEI number on the device match with the recorded information.

There are several weaknesses with this existing solution. Administering the system is very labor intensive. Using stickers as a verification method is prone to manipulation (stickers can be transferred from authorized devices to stolen devices, stickers could be forged if the color coding scheme is determined). Thorough validation of every device is too time consuming to be effective. Random selection for thorough validation provides a deterrent, but may be considered an acceptable risk by a thief.

Retail anti theft technologies (aka Electronic Article Surveillance (EAS)) that use various types of tags (RFID, Acousto-Magnetic, Electro Magnetic etc.) are a possible solution, but there are a number of issues. EAS is employed to solve the "inverse" of the problem we are trying to address. With EAS, devices that are NOT authorized to leave a facility are tagged. Using EAS tags to mark authorized devices is not practical because tags can potentially be transferred between devices and it is doubtful that most mobile device owners would want something "stuck" to their device that would mar it cosmetically, interfere with its operation or make fitting a protective case difficult. As with the existing solution described above, administration of the system is very labor intensive.

Another related technology is Electronic Access Control (EAC) using mobile devices as the credential. The function of EAC is to allow authorized persons entrance to a facility and is rarely if ever used to control exit from a facility EAC does not aim to control a device entrance or exit to a facility.

BRIEF SUMMARY OF THE INVENTION

There are three basic minimum steps in one preferred embodiment of the proposed solution: 1) Request Authorization: The authorized mobile device requests authorization to allow device entry and/or exit from a facility or group of facilities, 2.) Validate Authorization Request: The device authorization request is validated by local devices or a server as the device enters and/or exits the facility, 3.) Device Verification: Ensure with some non-zero, degree of probability, acceptable to those responsible for facility security, that the mobile device about to enter/exit is the same mobile device that was validated at step 2. The primary goal is to prevent one mobile device's access rights from being used by another, different mobile device. In some cases, it will be possible to combine these steps. It should be noted that device verification is the most difficult part of this process to perform reliably for reasons discussed below.

To further improve security, additional steps may be taken such as: Verify the identity of the person presenting the mobile device to decide if the owner is the valid holder of the device. Ensure that no unauthorized devices enter/exit the facility so that persons entering/exiting facility claiming not to be carrying an unauthorized mobile device are indeed not carrying any such devices. Another step is to ensure that persons entering/exiting facility are authorized to enter the facility. A step to ensure the Mobile App is authentic may be required for additional security to avoid the possibility that the validation is being faked or mimicked, especially in the case where manual pattern comparisons are being used for validation. Ensure mobile devices are allowed to enter only if they are not already recorded as having entered. Similarly, for an exit. Maintain an audit trail and/or video record of each attempted entry or exit.

Many of these additional steps may be done automatically or manually. If done manually, they may be performed for every entrance/exit event or done on a random basis as a deterrent.

The level of security for such a system is a tradeoff between several factors including cost, complexity, and ease of use. Many of the scenarios presented here as illustrations/ examples are done so for the sake of completeness. While possible, many will be unlikely in most circumstances and taking measures to accommodate them will be unwarranted.

One possible constraint to a solution using the above steps is that mobile devices may not have access to a data network at the facility entrance/exit. This could be for a variety of reasons. For example—wireless network (cellular or Wi-Fi) coverage may be unreliable, or as a matter of facility security policy, network coverage may be generally unavailable to persons exiting/entering even though it is available to facility security personnel.

Example Implementations of Minimum Solution Steps.

First, Request Authorization: The Employee Mobile Device Requests Authorization. If there is network access this may be done by directly requesting said access from the controlling system in real time. Alternatively, a location key can be requested from the controlling system that may then be stored and used in conjunction with other system components at a later time when network access is not available. The key may be mobile device specific and or incorporate a valid time period or specific number of uses. In addition, keys may be self-authenticating and/or self-expiring and may require another key or corroborating data such as a PIN or Username/password to authenticate. A key can be obtained in any number of different ways, for example: 1) by contacting a Key Server using a network connection e.g. WiFi, 2) by directly entering a Key code obtained over the telephone from a system administrator, 3) by scanning a printed or displayed barcode or QR code or text code, 4) by wirelessly contacting a local device that has cached keys or can obtain keys from a server on behalf of the mobile device, and/or 5) by clicking a link in a web browser.

Second, Validate the Authorization Request as the device enters/exits the facility. A request can be validated in a number of ways, for example: 1) The current location key or request for access is automatically processed by either a local or remote portion of the system to determine its validity. Said Keys or requests may require additional corroborating credentials such as a PIN or username & Password. The portion of the system that validated the request then signals "Device OK" to an LPO who is responsible for allowing facility entrance or exit. As an alternative to manual "gating" by the LPO, the system could directly enable a gate allowing entrance/exit. Said gate needs to provide some method of allowing personnel with no phones to enter or exit such as a metal detector that allows gate opening only when no mobile device (metal) is detected, 2.) The current location key is processed by the employee mobile device and a validation pattern is displayed on the device screen. In a similar fashion, The Authorization Device processes the current location key and displays a pattern. If the LPO determines that the patterns match, then they allow facility entry/exit. The pattern consists of one or more of the following: Text, Graphics, Images, Animations or Sounds. Ideally the pattern would include a component that is device or user specific to aid in Device verification.

Third, Device Verification to ensure with some degree of probability that the employee mobile device that is about to exit or enter a facility is the same physical device that was validated in the "Validate the Authorization Request" step. The primary goal is to prevent one mobile device's authorization rights from being used by another Mobile Device. Examples of cases where there might not be a 100% probability of correspondence are as follows: 1.) If the Mobile device uses Wi-Fi to send a valid location key to an Authorization Device when not closely proximate the Authorization device then there is a possibility that the device physically presented at the Authorization device seeking access is not the device that sent the valid key, 2.) If the Mobile Device receives a valid location key and as a result displays a pattern that signifies "Device allowed" and that pattern can be displayed when riot within close proximity of an LPO then there is a possibility that the "Device Allowed" pattern could have been received from another phone in sufficient detail to fool someone checking the pattern for validity.

There are numerous ways to ensure some degree of correspondence between the device requesting authorization and the device physically about to enter or exit. When security concerns are low, and convenience or speed of authorization is important, a lower probability of correspondence might be acceptable. While other methods may exist, two basic strategies are preferred.

First, utilize validation transactions that corroborate with some degree of probability that the requesting device is the device presented for Entry/Exit.

Second, ensure that a validation transaction can only happen when the requesting device is closely proximate the entry/exit or Authorization Device. This close proximity ensures that the requesting device can be identified with a high degree of certainty.

For example, one or more of the following methods could be used to implement those strategies: 1.) The Mobile Device to be authorized is handed to the LPO and the LPO interacts with the Mobile Device to make the authorization request. Interaction may include the entry of corroborating data. Having the LPO interact directly with the Mobile Device will help to ensure the Mobile Device App is Authentic and not merely displaying a close replica or copy of an Authorization Pattern from another device. 2.) Use location based services so that the requesting device can only request entry when closely proximate the entry/exit. Said services could use resources that produce coarse location granularity (e.g. cell towers) when security concerns are minimal or much finer location granularity resources such as Bluetooth Beacons Location Severs. Said Bluetooth devices might also incorporate additional security features such as data encryption or validation of devices requesting data. 3.) Limit the range of any wireless transactions using short range technologies such as NFC or Optical scanning. 4.) Limit the range of non-short range technologies (e.g. WiFi) by using one or more of the following—very low transmit power, very low receiver sensitivity, antenna design, shielding such as a faraday cage, or a software algorithm in the Mobile Device App that looks for very high received signal strength (RSSI), 5.) Use wireless transactions that produce corresponding results on both the requesting device and the authorization device that can be manually or automatically checked. For example when using Pattern Matching as described above, if the pattern is generated based on a unique transaction ID obtained from the Location Device, then said patterns will be unique to a given entry/exit transaction. Therefore they cannot be easily replicated or otherwise transferred to an unauthorized device. 6.) Use wireless transactions that produce a corroborating result on the requesting device that is then manually or automatically verified. For example, when the authorization device receives a valid authorization request then it responds to the requesting device with a code that causes the requesting device to change its display pattern when the code is received. The LPO can then note the requesting device display changes at the appropriate time. 7.) Use transactions that produce a corroborating result on the authorization device. For example, require the Mobile Device to obtain an additional piece of information before being able to request authorization. Said information can only be obtained when the requesting device is about to enter or exit the facility. For example, a simple time varying QR code unrelated to the authorization process is optically scanned by the requesting device. The scanned code is then transmitted to the authorization device and is automatically or manually confirmed. 8.) Use a simple algorithm that verifies proper entry exit sequencing as a validating transaction. The Mobile Device would not be allowed entry if the previous transaction with the device was an Entry request. i.e., the Device is already in the facility. The analogous logic would be applied for an exit. Exit would not be allowed if the previous transaction was an Exit Request. 9.) When using pattern matching include a device or user specific component to make each device pattern just slightly unique, e.g. change some text while retaining the majority of the pattern. If the same device specific information was presented as part of a Validation Request in a short period of time the additional scrutiny of the request would be warranted.

Possible implementations of additional security steps beyond the basic minimum three solution steps suggested above include: 1.) Validate that the person presenting the mobile device is the owner or authorized holder of the device. This can be done as follows: Based on the device ID of the Employee mobile device requesting entry exit, display the Employee Image on the Mobile Device or Authorization device for viewing by the LPO. Or, use Multifactor Authentication (MFA), for example the mobile device holder manually enters a PIN code, that is then confirmed by the Mobile device App OR the authorization device. Entering said PIN might alter the Pattern on one or both devices to aid in said MFA and also verify App authenticity. 2.) Ensure that no unauthorized devices enter/exit the facility along with an authorized device for every entrance/exit event or on a random basis as a deterrent. This may be accomplished by Manual search and/or Metal detector/body scanner. 3.) Ensure that persons entering/exiting facility are authorized to enter the facility. This can be implemented with well known traditional access control methods. This step may be combined with minimum steps or done as a separate process. In some cases it may not be deemed necessary. 4.) Authenticate the Mobile App by requiring the entry of additional corroborating information at the time of access to generate a pattern. In addition, or alternatively, require that security personnel directly control the Mobile Device to generate the validation pattern rather than simply viewing a pattern. This avoids the issue of a device holder manipulating the device to mimic a validation. 5.) Ensure that Mobile Devices are allowed to enter only if they are not already recorded as having entered and similarly with exits. This is a straight forward task for anyone skilled in the art by checking an audit trail. An audit trail and/or video record of each attempted entry or exit can be maintained. The methods and equipment for doing this are well known to those skilled in the art.

Featured is a mobile device verification method for a facility, the method including the mobile device requesting authorization to permit entry to and/or exit from the facility, validating said mobile device request, and verifying, as a mobile device enters and exits the facility, that the mobile device is the mobile device whose authorization request was validated.

Requesting authorization may include downloading an application to the mobile device, registration of the device, and displaying a validation screen generated by the application when proximate the facility entry and/or exit. Verifying may include limiting to the distance that one or more of the wireless transactions can be conducted (for the purpose of helping to ensure that said transactions can be associated with the mobile device seeking permission to enter or exit) OR (to less than 50 meters). In one method, there is no communication between the mobile device and an Authorization Device, Validation and/or verification may include communications between the Mobile Device and the Authorization Device and/or the Server, Validating the request may include displaying, on an authorization device, a validation screen. Validating may include comparing the validation screen on the mobile device to the validation screen on the authorization device and allowing the mobile device to enter and/or exit the facility only if the validation screen on the mobile device matches the validation screen on the authorization device.

Also featured is a facility mobile device verification system including a server configured to register the mobile device and an authorization device, and provide to the mobile device and the authorization device an application and a key. A wireless location device proximate an entry into and/or exit from a facility is configured to generate on the mobile device and the authorization device, when proximate the location device, a validation screen decoded via the key and the application, for verifying that the mobile device is authorized to enter and/or exit the facility.

Also featured is a mobile device verification method for a facility, the method including downloading onto the mobile device an application which generates a validation screen which changes over time, registering, via the application, the mobile device, and authorizing the mobile device to pass by a wireless location device having a unique identifier when proximate the wireless location device, the application on the mobile device is opened and the application wirelessly receives the unique identifier of the wireless location device. In response to receiving the unique identifier of the wireless location device, the application generating a validation screen on the mobile device. The method includes visually comparing the validation screen on the mobile device with a validation screen on an authorization device and allowing the mobile device to pass the wireless location device if the validation screen on the mobile device matches the validation screen on the authorization device. If the validation screen on the mobile devices does not match the validation screen on the authorization device, the mobile device is not allowed to pass the wireless location device.

The authorization device may be a mobile device having the application downloaded thereon and registered and authorized to pass the wireless location device. The application of the authorization device may wirelessly receive the unique identifier of the wireless location device and in response may generate a validation screen on the authorized device. The method may further include additional wireless location device at different security checkpoints and each wireless location device having a unique identifier. The authorization may include authorizing a mobile device to pass by more than one wireless location device. Registering may include providing a user name and a phone number for the owner of the mobile device.

Also featured is a facility mobile device verification system including a server configured to register a mobile device and authorize the mobile device to pass by a wireless location device having a unique identifier. An application, downloadable on the mobile device, is configured to generate a validation screen which changes over time, and read the unique identifier of the wireless location device. The wireless location device is located at a security checkpoint and is configured to provide its unique identifier to the mobile device application when the mobile device is proximate the wireless location device. An authorization device is configured to generate a validation screen when proximate the wireless location device to be compared with the validation screen of the mobile device.

The authorization device may be a mobile device having the application downloaded thereon and registered and authorized to pass the wireless location device. The application of the authorization device may be configured to wirelessly receive the unique identifier of the wireless location device and in response to generate a validation screen. The system may further include additional wireless location devices at different security checkpoints and each wireless location device having a unique identifier. The server may be configured to authorize a mobile device to pass by more than one wireless location device. The server may be configured to register a mobile device by requiring a user name and phone number from the owner of the mobile device.

The key issue is verifying the device that is presented for entry/exit is the device that was authorized. Solving that issue reliably can be accomplished by limiting the range of any wireless transactions.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 9 depicts the process at the Server for Registering a Mobile Device;

DETAILED DESCRIPTION OF THE INVENTION

Figure 1:
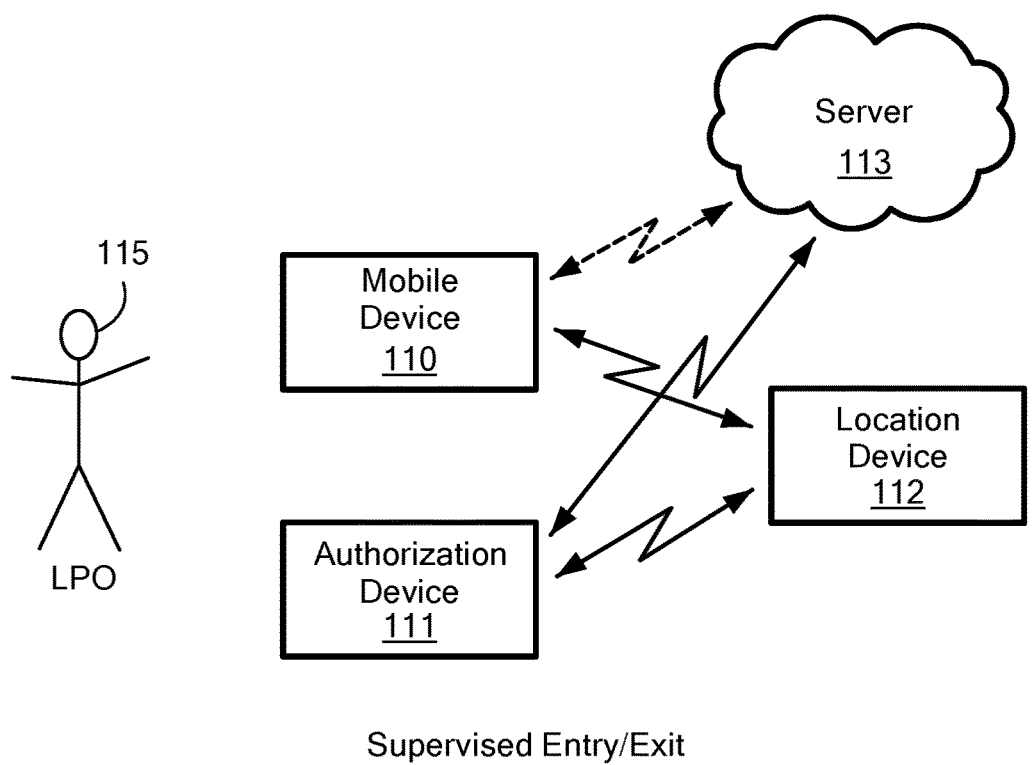
FIG. 1 is an example of a system with entry/exit supervised by a Loss prevention officer (LPO) and the mobile device is offline and unable to communicate with the Server when at the entry/exit.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. The claims hereof are not to be limited to the two embodiments described herein. Moreover, the claims hereof are not to be read restrictively unless there is clear and convincing evidence manifesting a certain exclusion, restriction, or disclaimer.

Figure 9A:
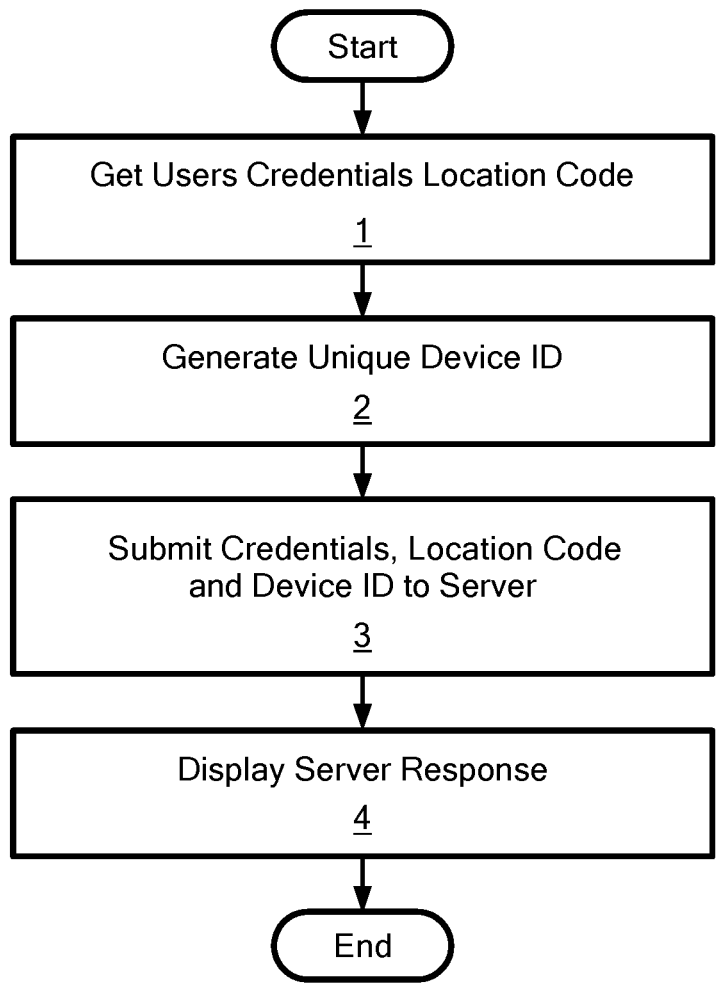
FIG. 9A depicts the process at the Mobile Device for Registering said Mobile Device with the Server.

There are several possible implementation scenarios for a complete system using the previously described Minimum Solution Steps (Request Authorization, Validate Request, Device Verification) and a plurality of possible implementation for said steps. Two complete system examples are described below 1.) Offline Supervised Entry 2.) Online Unsupervised Entry One Time Mobile Device Registration—Summary A one time Mobile Device registration (FIGS. 9, 9A) applies to both example system implementations—Offline Supervised Entry and Online Unsupervised Entry. One Time Registration includes the following steps: 1.) Prior to using the system for device authorizations, the employee downloads the Mobile Device Authorization application to their device, 2.) The employee enters their name and credentials and a provided facility location code to register and request authorization rights. 1.) This action automatically generates a unique Mobile device ID and submits it along with the user credentials to the Server. 4.) The employee is now associated to this specific Mobile Device in the Authorization Database on the server. 5.) A facility manager will be notified that the employee has requested authorization rights. 6.) The Facility Manager then verifies that the employee is not presently in the facility and 7) uses a Server Portal to approve the request for authorization rights. 8.) Upon said approval, the server updates the Authorization Database to allow authorizations for this device to be processed when requested.

The system will not allow users to register more than one device per employee. If employees need to change devices, they will be required to request their old device be de-registered from the Server by the facility manager prior to registering the new device. This prevents employees from being able to register new devices without approval.

One Time Mobile Device Registration—Details

One Time Mobile Device Registration includes the following detailed steps: The steps at the Server are shown FIG. 9: Server-Register Mobile Device are accomplished by: Step 191—Receive the Mobile Device User credentials, Location Code and Mobile Device ID. Step 192—Check to see if User is already registered, if not registered then step 193, else step 196. Step 193—Notify Facility Manager of Request for Access. Step 194 check if access approved, if approved step 195 else step 196. Step 195—Update the registration database with Mobile Device Info and go to step 197. Step 196—Send "access denied" msg to Mobile device go to END. Step 197—Send "access allowed" message to Mobile Device go to END.

At the Mobile Device: Mobile Device Registration (FIG. 9A) includes four steps: Step 1—Get credentials from Mobile Device User. Step 2—Generate a unique Mobile Device ID. Step 3—Submit credentials and Mobile Device ID to Server and Step 4—Display Server Response.

Offline, Supervised Entry—Summary

An offline, supervised entry/exit, FIG. 1, wherein there is no network access for mobile devices at the facility. However, the Authorization Device used by the LPO does have network access to the server. Entry/exit is supervised by facility personnel, referred to in this example as a loss prevention officer (LPO) 115. Prior to use of the system the employee downloads the Mobile Device Authorization application to their device and does a one time registration to get the right to request authorization for their device. The LPO 115 follows exactly the same registration process prior to their first use of the system. Details of the Mobile Device Registration process were previously described.

For this Offline, Supervised Entry implementation (FIG. 1), the "Minimum Solution Steps" are implemented as follows:

Request Authorization Step: Since there is no network access for Mobile Devices 110 at the entry/exit, a key previously obtained from the Server 113 when in network coverage is used to request device entry/exit authorization.

Validate Request Step: The LPO 115 is responsible for Validating the Request by verifying a match between the pattern displayed on the Authorization Device 111 and the Employee Mobile Device 110 being authorized.

Device Verification Step: The Validate Request Step can only be performed in close proximity to the entry/exit, i.e., the pattern can only be displayed on a device when in very close proximity to the entry/exit. Assuming the LPO has manually verified that there are no other devices proximate the location device 112. This ensures with a reasonable degree of probability that the pattern validation is associated with presented device, thus verifying the device.

The Offline, Supervised Entry example preferably includes four components. 1.) A Location Device 112 which broadcasts an encrypted advertisement, to be installed at the facility, in the location that devices are validated. 2.) A Mobile Device 110 configured with an application (App) which can use digital keys to interpret said advertisement, generate a unique device ID, provide registration functionality, and display visual feedback for validation. 3.) An Authorization Device 111 configured with the same App as the Mobile Device. 4.) A Server 113 is used to grant and revoke authorization rights and serve digital keys to users.

The summary steps for the Offline, Supervised Entry/Exit example includes:

The employee Requests Authorization as follows:

1.) While in Network coverage and prior to arrival at the facility, the employee opens the App on the Mobile Device 110, logs into the Server 113 with the credentials they provided during registration. 2) if the login is successful, the App retrieves the digital key from the Server and the App can then be closed. 3.) Upon arrival at the facility, the employee opens the App. 4.) If the Mobile Device 110 is closely proximate the Location Device 112 corresponding to the location they have been granted authorization for, the app will decode the Location Device advertisement with the digital key previously obtained from the Server 113 and 5.) Display a validation screen with a generated pattern that includes the current time and date, and an animation which is unique for the current date & time and location.

The LPO 115 Validates the Request:

The LPO 115 will follow a similar process using, an Authorization Device 111 configured with the same App as the one used by the employee. 6.) The LPO 115 if necessary opens the App, logs into the Server 113 with the credentials they provided during registration. 7.) The LPO 115 then follows the same steps as the employee (above steps 2-5). 8.) The Authorization Device 111 will then display a unique generated pattern. 9.) The LPO 115 validates the employee Authorization Request by visually verifying that their screen matches that of the employees device.

The LPO 115 Verifies the Device:

10.) The LPO 115 confirms there are no other devices closely proximate the location device 112. A device will only generate a validation screen with the correct pattern and current time stamp when closely proximate the location device 112. Therefore, if there are no other devices closely proximate the location device 112 then the employee device has likely generated the validation pattern and is not displaying a facsimile transmitted from another nearby device. The Employee Device is thus verified with a reasonable degree of certainty.

12.) If the request is validated and the device is verified, the employee is permitted to enter the facility with the device, else he is not allowed to enter with said device. Prior to exiting the facility, the employee will be required to follow the exact same steps followed on entry.

Offline, Supervised Entry—Detailed Description

The system of FIG. 1 has four components, a Location Device 112, a Mobile Device 110, A Server 113 and an Authorizations Device 111.

Figure 4:
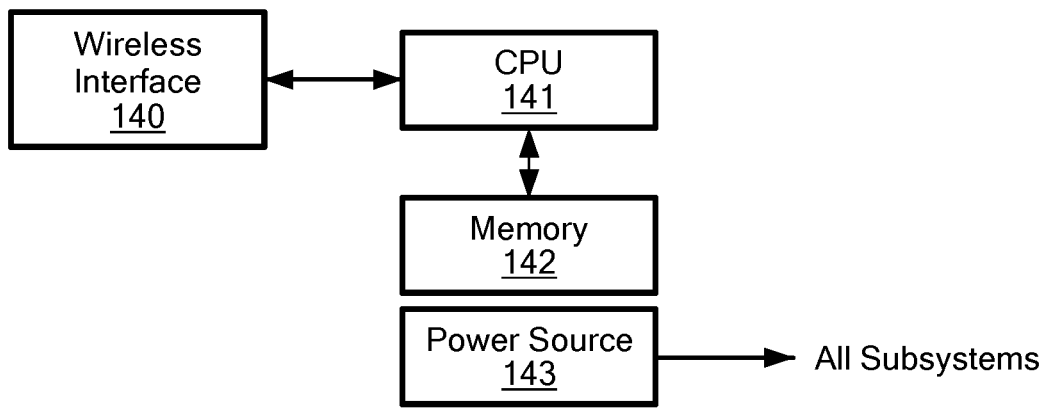
FIG. 4 depicts the components of a Location Device.

Location Device 112, detailed in FIG. 4 is installed at the facility, in the location where mobile devices are to be validated, and broadcasts a low power encrypted advertisement for a short range. Receipt of an advertisement by a Mobile Device 110 at a high received signal strength (RSSI) level implies close proximity to the facility entrance/exit. The Location Device 112 may include a CPU 141, memory 142 for program and data storage, a wireless transmitter 140 for broadcasting advertisements, and a power source 143. For additional security it may be advantageous for the wireless subsystem to be a transceiver so that encrypted information is sent only when requested by an Authorized Mobile Device 110 with an authentic Mobile Device application. In addition, data corroborating the entry/exit transaction can be sent to the location device 112 and then passed to the Authorization Device 111. The functions of the Location Device 112 could also be accomplished by the Authorization Device 111 with somewhat less security than an independent, permanently installed Location Device 112 that has no human interface.

Figure 2:
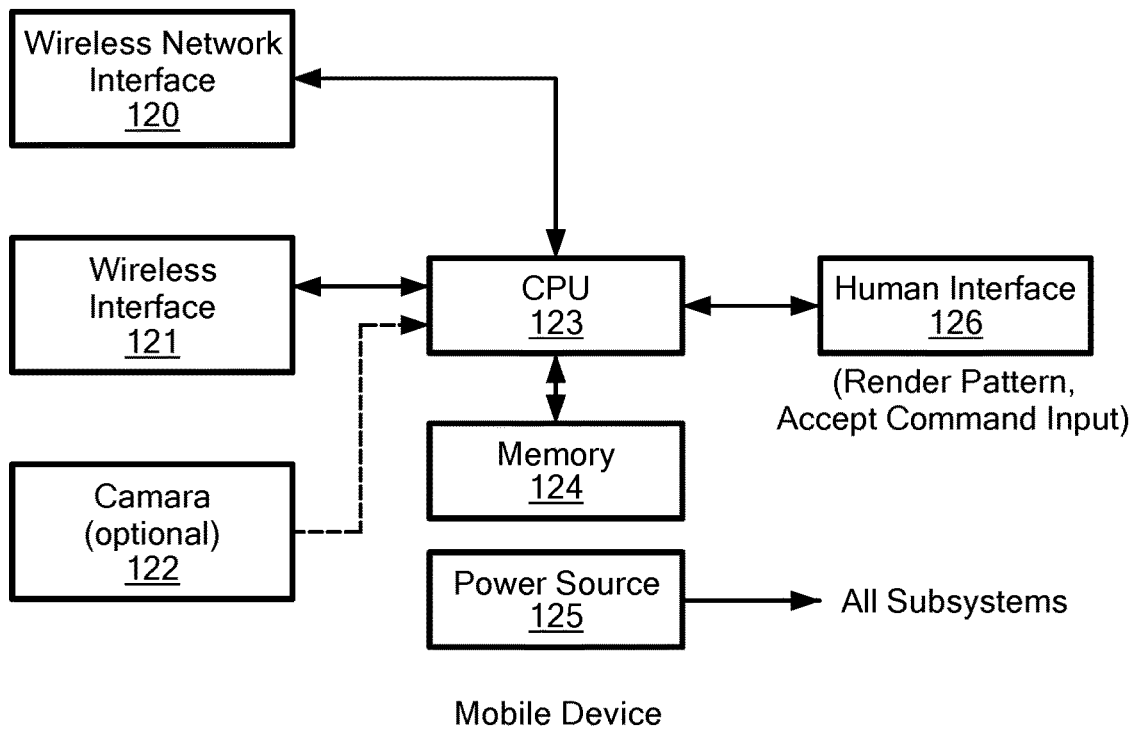
FIG. 2 depicts the components of a Mobile Device.

The Mobile Device 110 detailed in FIG. 2 is configured with a Mobile Device Authorization Application (App), which can use a Location Key obtained from the Server 113 to decrypt the Location Device 112 Advertisement, generate a unique device ID, provide registration functionality, and based on the Location Key and Location Device Advertisement display a pattern for the LPO 115 to validate against the pattern displayed on the Authorization Device 111. The Mobile Device 110 preferably includes a CPU 123, memory 124 for program and data storage, a wireless interface 121 for receiving broadcasting advertisements (e.g. Bluetooth), a wireless network interface 120 for communicating with a Server (e.g. Wi-Fi), a human interface 126 (e.g. touchscreen & display) and a power source 125. The wireless interface used for receiving advertisements may be combined with the wireless network interface if they both use the same communication protocol.

Figure 5:
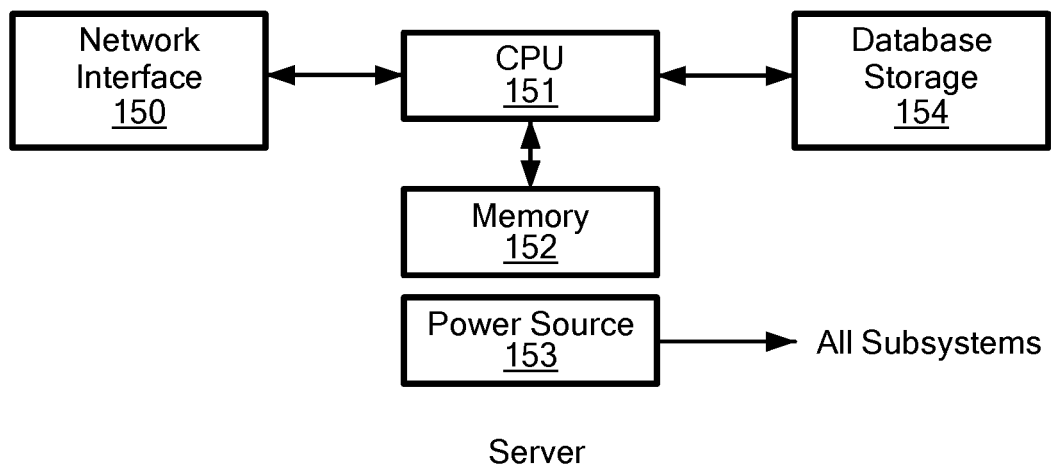
FIG. 5 depicts the components of A Server.

The Server 113 described in FIG. 5 is used to register Mobile Devices 110 and Authorization Devices 111, grant and revoke Location access rights and Serve Location Keys to Mobile Devices 110 and Authorization Devices 111.

The Server 113 preferably includes a CPU 151, Memory 152 for program storage and data, a network interface 150 a database 154 to hold Mobile Device Authorization related data and a power source 153.

Figure 3:
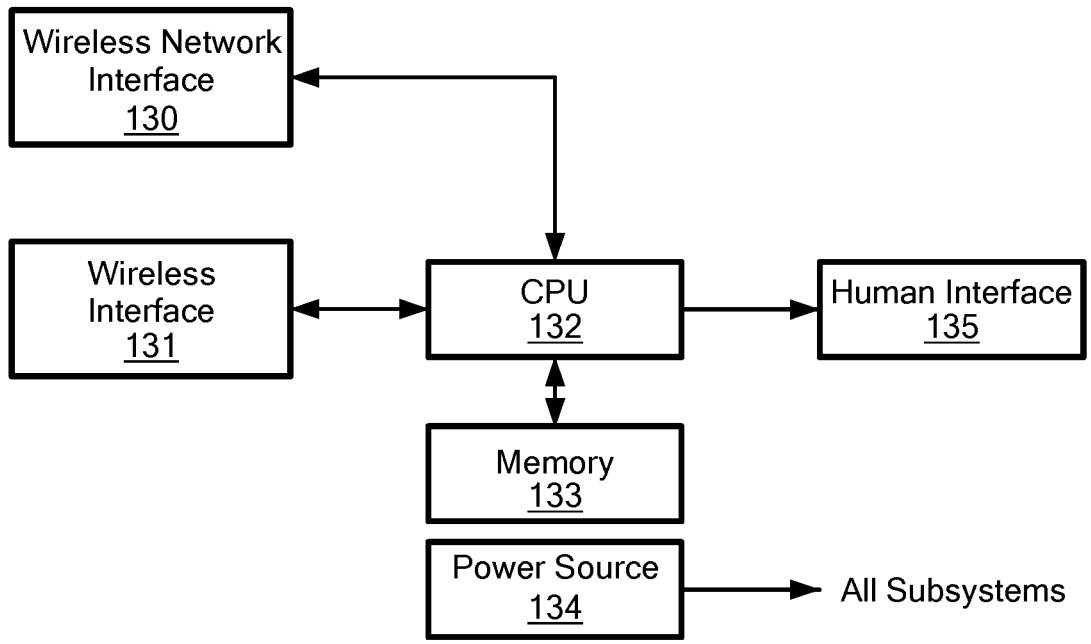
FIG. 3 depicts the components of an Authorization Device.

The Authorization Device 111 described in FIG. 3 is used by the LPO 115 to validate Mobile Device 110 requests. The Authorization Device 111 uses a Location Key obtained from the Server 113 along with the Location Device 112 Advertisement to generate a pattern on the its Display. The LPO 115 compares this pattern with the pattern generated on the Mobile Device 110. If the patterns match then the Mobile Device 110 is authorized.

The Authorization Device 111 preferably includes a CPU 132, memory 133 for program and data storage, a wireless interface 131 for receiving broadcasting advertisements (e.g. Bluetooth), a wireless network interface 130 for communicating with a Server (e.g. Wi-Fi), human interface 135 (e.g. touchscreen & display) and a power source 134. The wireless interface used for receiving advertisements may be combined with the wireless network interface if they both use the same communication protocol.

Figure 8:
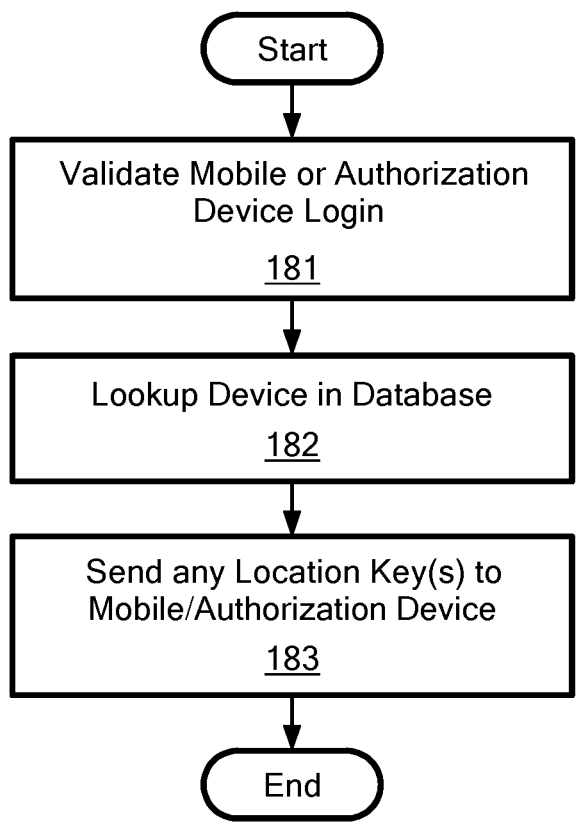
FIG. 8 depicts the process at the Server for Granting a Location Key.

If there is no network access for Mobile Devices 110 (FIG. 1) at the entry/exit, the Mobile Device 110, must retrieve the current location key from the Server 113 when in network coverage and prior to arrival at the facility as described in FIG. 8. When closely proximate to the entry/exit the Mobile Device 110 receives the encrypted advertisement broadcast from the Location Device 112. The Location Key is used to decrypt said advertisement and along with the Location key it is used to generate a pattern on the display of the Mobile Device 110. Likewise a pattern is generated on the Authorization Device 111 using exactly the same process. The LPO 115 manually compares the pattern on the Mobile Device 110 with the pattern on the Authorization Device 111. If the two patterns match the device is allowed to enter/exit.

Figure 10:
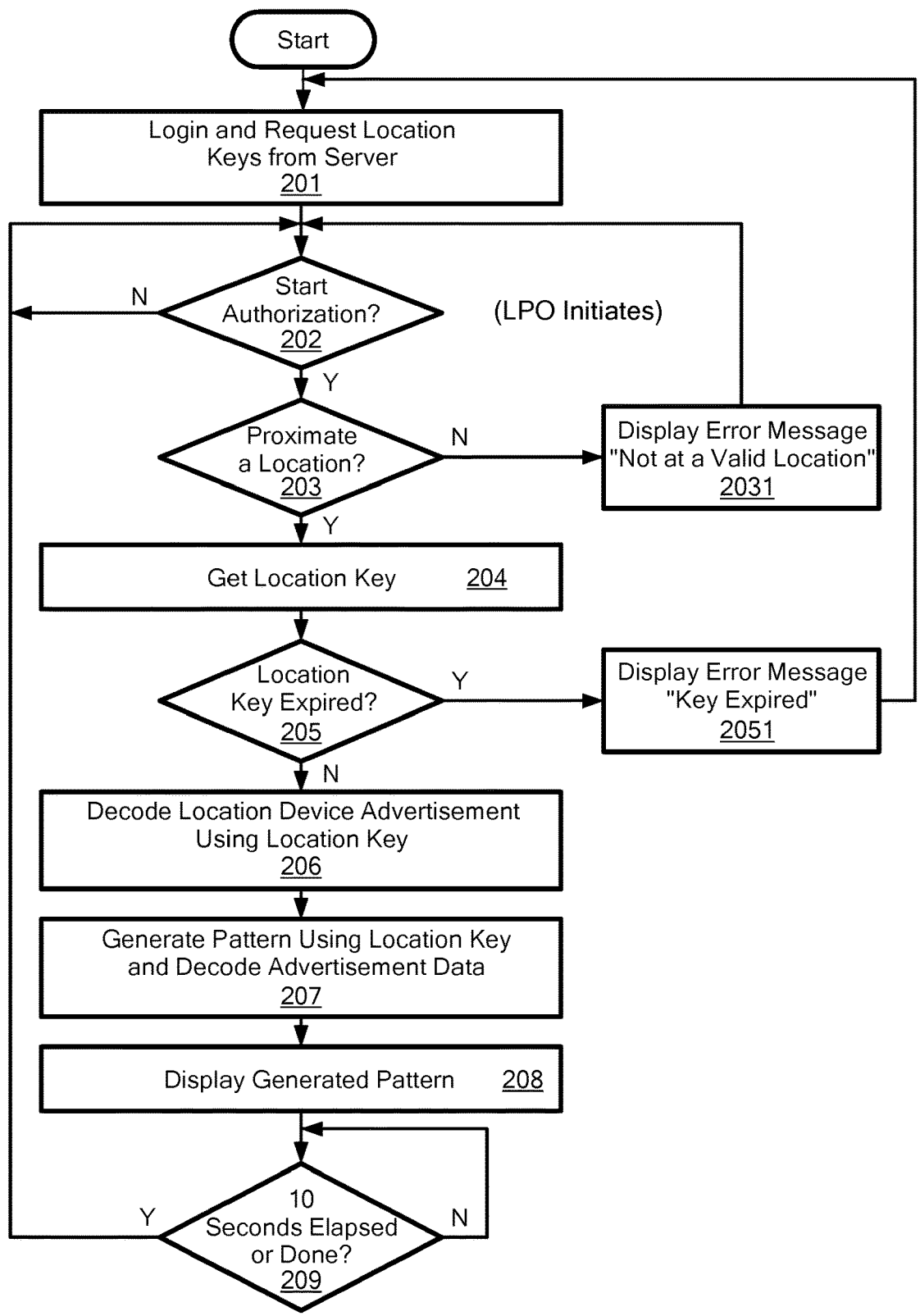
FIG. 10 depicts the process in the Mobile Device App in the example case of a Supervised, Offline Entry/Exit (FIG. 1)

The processing of each of the components is detailed in FIGS. 8, 10, 11 as follows: The Server-Grant Location Key (FIG. 8) routine includes: step 181—validating Mobile or Authorization Device Login, Step 182—Looking up requesting Device in Database, and step 183—sending any location key(s) to requesting Device.

Mobile Device Authorization (FIG. 10) includes: Step 201—when a network connection to the server is available and prior to requesting device access at the location, the Mobile Device 110 receives a current Location Key from the Server 113. Step 202—The Mobile Device 110 becomes proximate the location where entry/exit is desired and the Device holder presses the "Start Authorization" key visible in the Mobile Device Authorization App, Step 203—As a result of being closely proximate a location, as determined by receiving a Location Device 111 Advertisement at an appropriate threshold RSSI, a check is made, for a corresponding location key. Correspondence is determined by using an unencrypted Location ID in the Location Device Advertisement. If there is a corresponding Location Key proceed to step 204, else step 2031—display an error message and return to step 202. Step 204—The Location Key is retrieved from Mobile Device Local memory. Step 205—The Location Key expiration is checked, and if not expired processing proceeds to step 206, else step 2051—display an error message and return to step 201, Step 206—using the Location. Key, the Location Device Advertisement is decoded. Step 207 using the Location Key and decoded data from the Location Device Advertisement, the Mobile Device generates a pattern that also includes current date and time. Step 208—The generated pattern is displayed. Step 209 when the "Done" key is pressed or after a period of 10 seconds return to step 202.

In a similar fashion to the process on the Mobile Device 110, the LPO 115 uses Authorization Device 111 to retrieve the current location key from the Server 113 as previously described (FIG. 8) and receives the encrypted advertisement broadcast from the Location Device 112. The Location Key is used to decrypt said advertisement and along with the Location key it is used to generate a pattern on the display of the Authorization Device 111. The LPO compares the generated pattern on the Authorization Device 111 with the pattern on the Mobile device 110 for a match. If the patterns match the device is allowed to enter/exit. In addition The LPO 115 performs additional manual steps to Verify the Device by ensuring there are no devices proximate the location.

Figure 11:
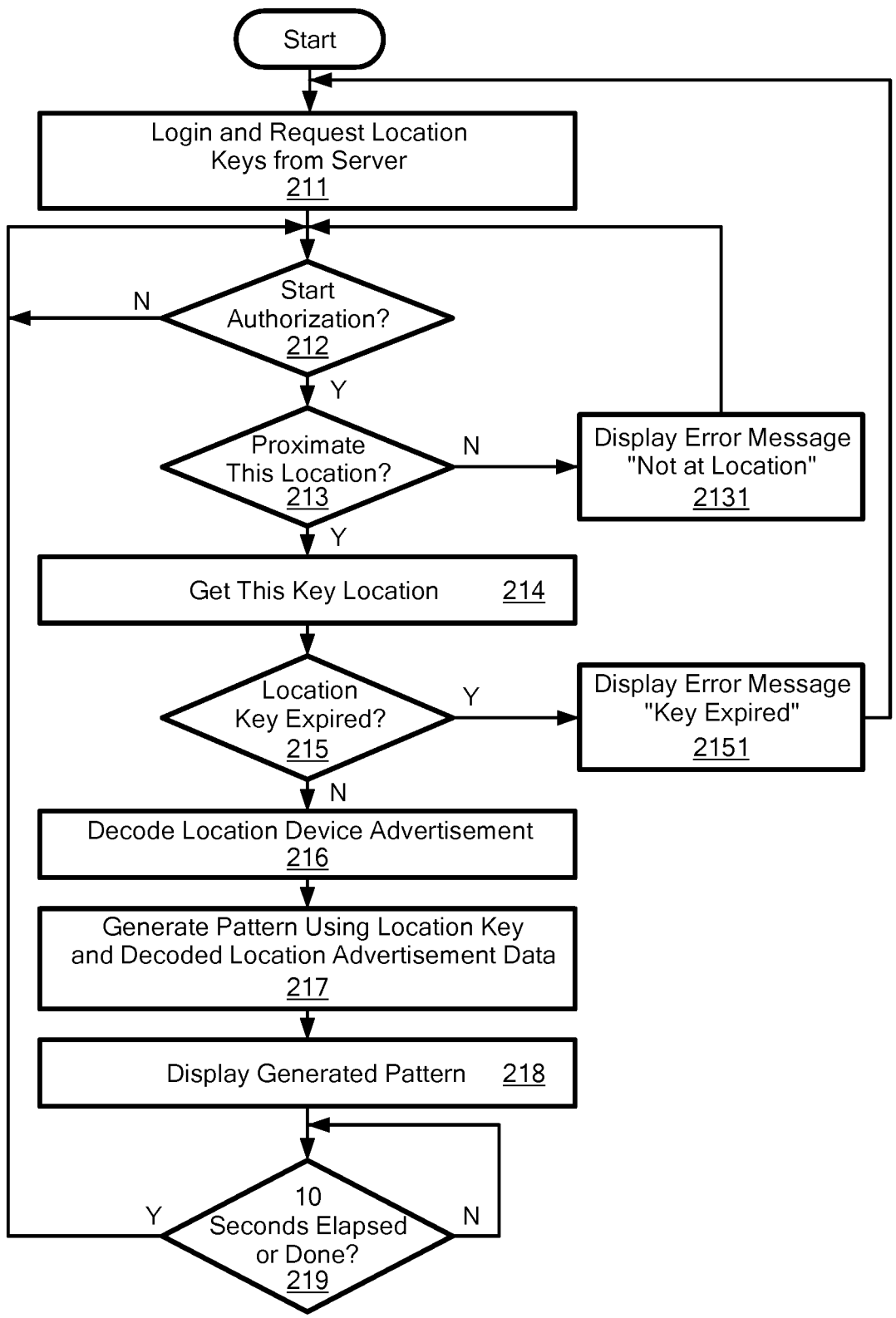
FIG. 11 depicts the process in the Authorization Device App in the example case of a Supervised, Offline Entry (FIG. 1)

The processing steps of Authorization Device App, FIG. 11 are as follows: In step 211 the current Location Key for this location is requested from the Server 113. (Unlike the Mobile device we are assured a connection to the Server 113 in real time.) Step 212—When an employee requests access with a Mobile Device 110, the LPO 115 presses the "Start Authorization" key visible in the Authorization App. Step 213—As a result of being proximate a location, as determined by receiving a location device 112 broadcast at an appropriate threshold RSSI, a check is made for a corresponding location key. Correspondence is determined by using an unencrypted Location ID in the Location Device Advertisement. If there is a corresponding Location Key proceed to step 214, else step 2131—display an error message and return to step 212. Step 214—The Location Key is retrieved from Authorization Device local memory. Step 215—The Location Key expiration is then checked, if not expired then proceed to step 216, else step 2151—display an error message and return to step 211. Step 216—using the Location Key, the Location Device Advertisement is decoded. Step 217—Using the Location Key and decoded Data from the Location Device advertisement, the Authorization Device 111 generates a pattern that also includes current date and time. In step 218, the generated pattern is displayed. The LPO 115 may manually compare the pattern on the Authorization Device 111 with the pattern on the Mobile Device 110 that requested access. If the patterns match the device is allowed to enter/exit. Step 2219—When the "Done" key is pressed or after a period of 10 seconds, return to step 212.

The Offline, Supervised Entry/Exit-Device Verification Step is implicit as a result of the way in which the Validate Request is accomplished. The previous Validate Request Step can only be performed in close proximity to the entry/exit, i.e., the pattern can only be displayed on a device when in very close proximity to the entry/exit. Assuming the LPO 115 has manually verified that there are no other devices proximate the location device 112 this ensures with a reasonable degree of probability that the pattern was generated by the authentic Mobile Device app on the presented device displaying the pattern, thus verifying the device.

At random the Authorized Mobile Device holder is then subject to a search or scan performed/monitored by the LPO 115 to ensure they are not carrying any unauthorized devices. Employees with no Mobile Devices request said type of access from the LPO 115. At random they are then subject to a search or scan performed/monitored by the LPO 115 to ensure they are not carrying any unauthorized devices. Video surveillance is used as a deterrent to fraudulent behavior by either the employee or LPO 115.

Online, Unsupervised Entry—Summary

Figure 6:
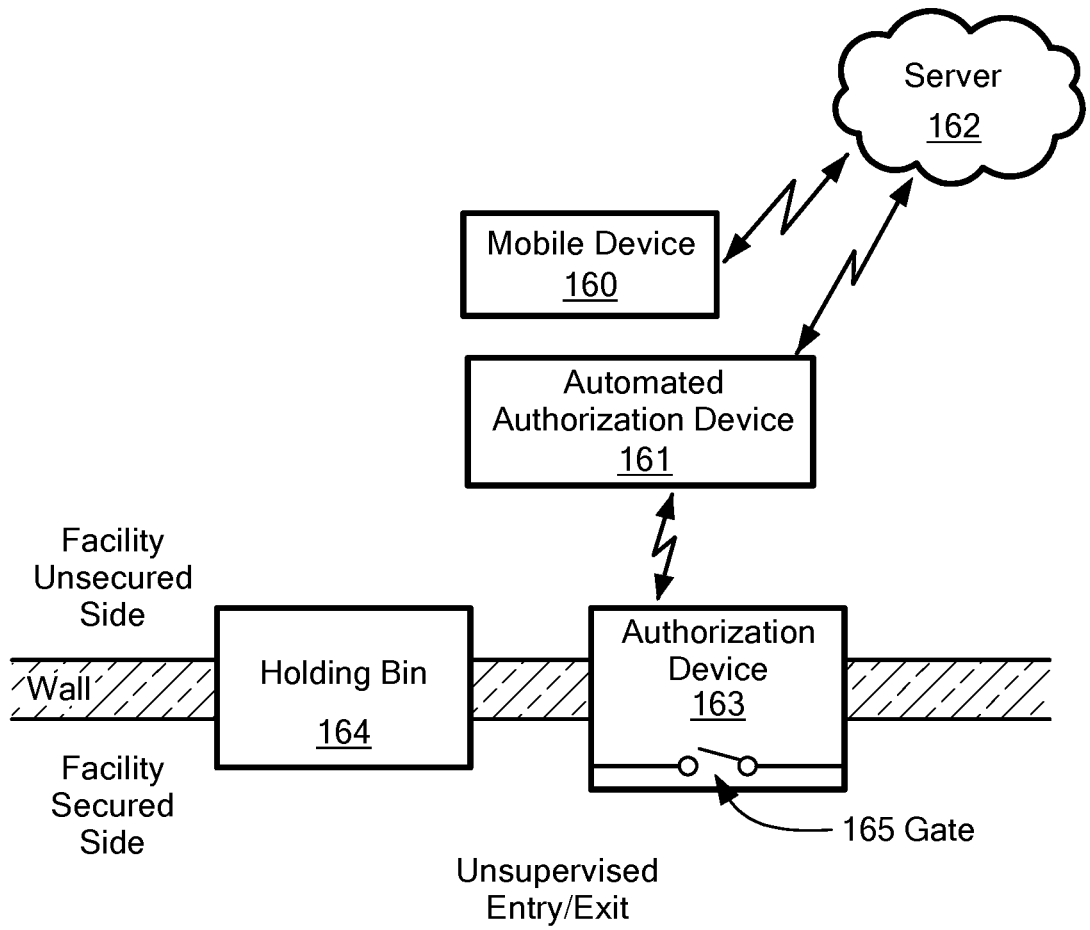
FIG. 6 is an example of a system with an unsupervised entry/exit; and the mobile device is Online when at the entry/exit.

An online, unsupervised entry/exit is shown in FIG. 6 wherein network access for mobile devices is available. All aspects of the transaction are handled automatically without the need for facility personnel. Prior to use of the system, the employee downloads the phone application to their Mobile Device 160 and does a one time registration to get the right to request authorization for their device. Details of the Mobile Device Registration process were previously described.

Since Entry/Exit is unsupervised, Device entry/exit control is automated using a Gate 165 controlled by the Automated Authorization Device 161 in the following manner:

If the Mobile Device 160 is authorized and verified, the local Automated Authorization Device 161 directs the Mobile device holder to a Device Detector 163 and to place his Mobile Device 160 in the Holding Bin 164 outside the Device Detector 163 along with any other material likely to trigger the Device Detector 163. If the automated authorization Device 161 determines via the Device Detector 163 scan that the Mobile Device holder does not have any additional Mobile Devices then the automated Authorization Device 161 unlocks a gate 165 allowing the Device Holder to enter/exit the facility. The Device Holder retrieves his Authorized/Verified Mobile Device 160 from the Holding Bin 164. Video surveillance is used to audit all transactions and act as a deterrent for fraudulent behavior on the part of the Device Holder.

Employees with no Mobile Devices request said type of access via the automated Authorization Device 161. They are directed to the Device Detector 163 and in a similar fashion to the case previously described their request for entrance or exit is processed according to the results of the Device Detector scan.

For this Online, Unsupervised Entry implementation, the Minimum Solution Steps are implemented as follows:

Request Authorization Step: Since there is Network access the Mobile Device 160 makes a real time request to the Server 162 for entry/exit.

Request Validation Step: The request is validated by the Server 162 using Mobile Device ID and user credentials as well as Location ID & corroborating data in the form of a Transaction ID. The Location ID and Transaction ID are obtained by the Mobile Device 160 scanning a QR code displayed on the Automated Authorization Device 161 at the entry/exit.

Device Verification Step: The QR code containing Location ID & Transaction ID must be scanned by requesting device when closely proximate the Automated Authorization Device 161 and since the Transaction ID changes with each authorization attempt and cannot be reused by another Mobile Device, there is a very high degree of probability that the device presented for entry/exit is the device that was validated in the previous step.

The Online, Unsupervised Entry_example (FIG. 6) preferably includes six components:

An Employee Mobile Device 160 described in FIG. 2, in this example is a phone configured with a phone application (App) which is used to scan a Location QR code displayed on the Automated Authorization Device 161. Data from said QR code is sent to the Server 162 along with the employee's credentials to request facility entry/exit. The App also provides registration functionality.

Figure 7:
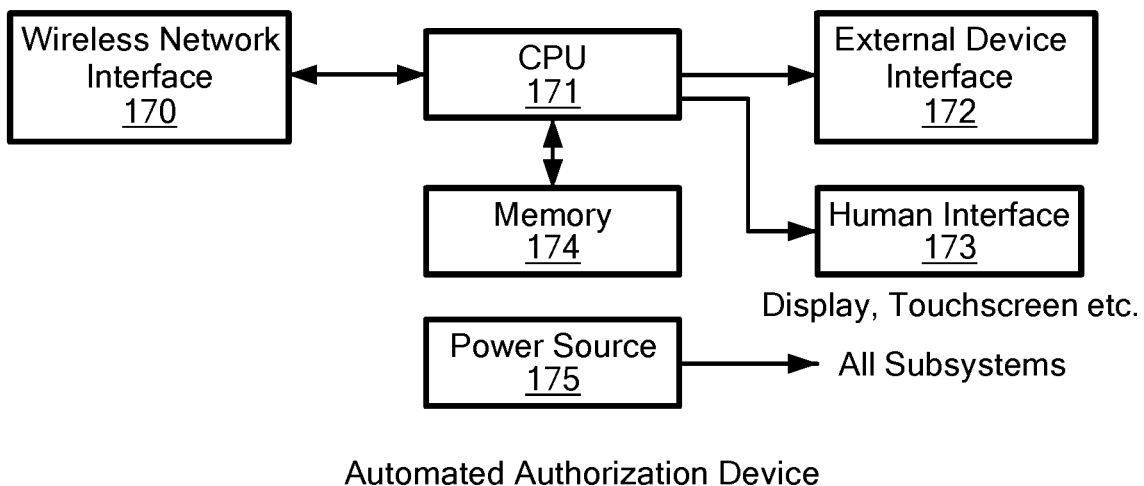
FIG. 7 depicts the components of an Automated Authorization Device.

An Automated Authorization Device 161 described in FIG. 7 in this example is a Tablet configured with an Authorization App that displays a Location QR code. It interfaces to the Device Detector 163/Gate 165 and communicates with the Server 162 in real time via a network. It works in conjunction with the Server 162 to process authorization requests made by the employee using Mobile Device 160.

The Automated Authorization Device of FIG. 7 includes a CPU 171, memory 174 for program and data storage, a wireless network interface 170 for communicating with a Server (e.g. Wi-Fi), human interface 173 (e.g. touchscreen & display), external device interface 172 for communicating with local peripheral devices such as a Device Detector and a power source 175. A Server 162 described in FIG. 5 is used to grant and revoke authorization rights, register employee Mobile Devices 160 and process authorization requests from said devices in conjunction with the Automated Authorization Device 161.

A Device Detector 163 is a device capable of detecting the presence of a mobile device e.g. Metal detector, x-ray scanner etc. It works in conjunction with another component, Gate 165 that prevents passage of the Employee until opened by the Server 162 via the Automated Authorization Device 161.

Holding Bin 164 is a small bin for holding authorized/verified devices with access from both the secure side and unsecured side of the Device Detector 163/Gate 165.

Summary steps for the Online, Unsupervised Entry/Exit example include:

The employee Requests Authorization as follows:

1.) Upon arrival to the facility, when closely proximate the Automated Authorization Device, the employee opens the App on the Mobile Device 160 and using the App scans the Location QR code displayed on the Automated Authorization Device 161 with the camera in the Mobile Device 160. 2.) The Mobile Device App then Requests Authorization by securely sending the QR Code Data. The Mobile Device ID and user credentials to the Server 162 using an encryption method only known to an authentic Mobile Device App and Server 162.

The Server 162 then Validates the Request as follow:

3.) The Server verifies the user credentials and device ID are valid, Implicitly, this verities that the Mobile App is authentic, since an improperly encrypted request to server will always fail. 4.) Using the Location data contained in the QR code dam the Server 162 verifies that the Mobile Device 160 is authorized at this location and is not currently inside the facility corresponding to the location by checking an Audit Trail Database The Server 162 Verifies the Device as follows:

5.) Using the transaction ID contained in the QR code the Server 162 verifies that the Transaction ID is a valid ID and has not been previously used. Since the Mobile Device 160 can only obtain QR code data when closely proximate the Automated Authorization Device 161 and the Transaction ID is valid and not previously used, then the Mobile Device 160 is Verified. Said_device is, with a reasonable degree of probability, the device presented for entry/exit and not another device in contact with the server from a location not closely proximate the authorization device. Note that video surveillance and other measures can be used to deter the case where another device closely proximate the authorization device is used to request authorization as a proxy for the unauthorized employee device.

6.) If the Request is Validated and the Mobile Device 160 is Verified the Server 162 contacts the Automated Authorization Device 161 to "Allow Access" for the Mobile Device 160. 7.) The Automated Authorization Device 161 upon receipt of the "Allow Access", Directs the employee to proceed to The Device Detector 163, and using a portal on the unsecured side of the gate, place their device in a Holding Bin 164 located outside the Device Detector 163. 8.) When the employee enters the Device Detector 163 and if the employee is not carrying a Mobile Device 160, then the Gate 165 is open and an audit trail message is sent to the Server 162. 9.) The employee retrieves their Mobile Device 160 from the Holding Bin 164 using a portal on the secure side of the Gate 161 Prior to exiting the facility, the employee will be required to follow the exact same steps followed on entry.

Online Unsupervised Entry—Details

Figure 12:
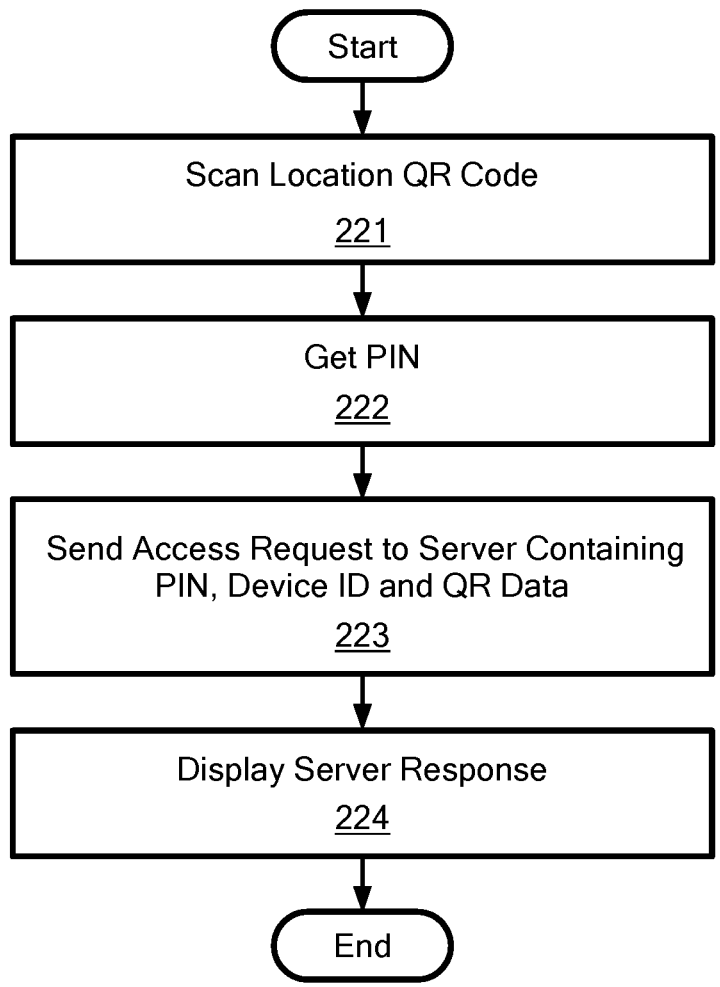
FIG. 12 depicts the process in the Mobile Device App in the example case of an Online, Unsupervised, Entry/Exit (FIG. 2)
Figure 13:
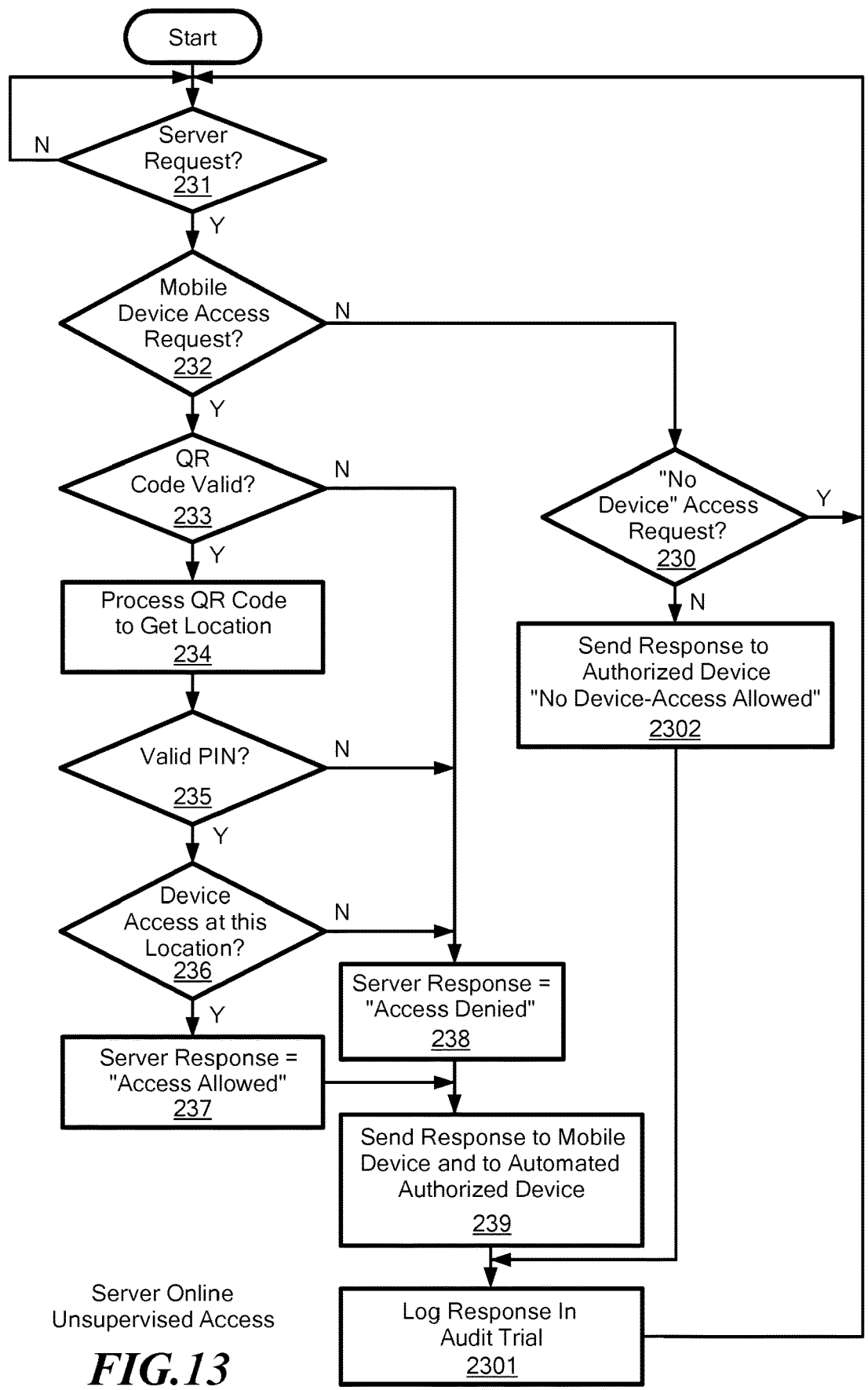
FIG. 13 Depicts the process at the Server in the example case of a Online, Unsupervised, Entry/Exit (FIG. 2)
Figure 14:
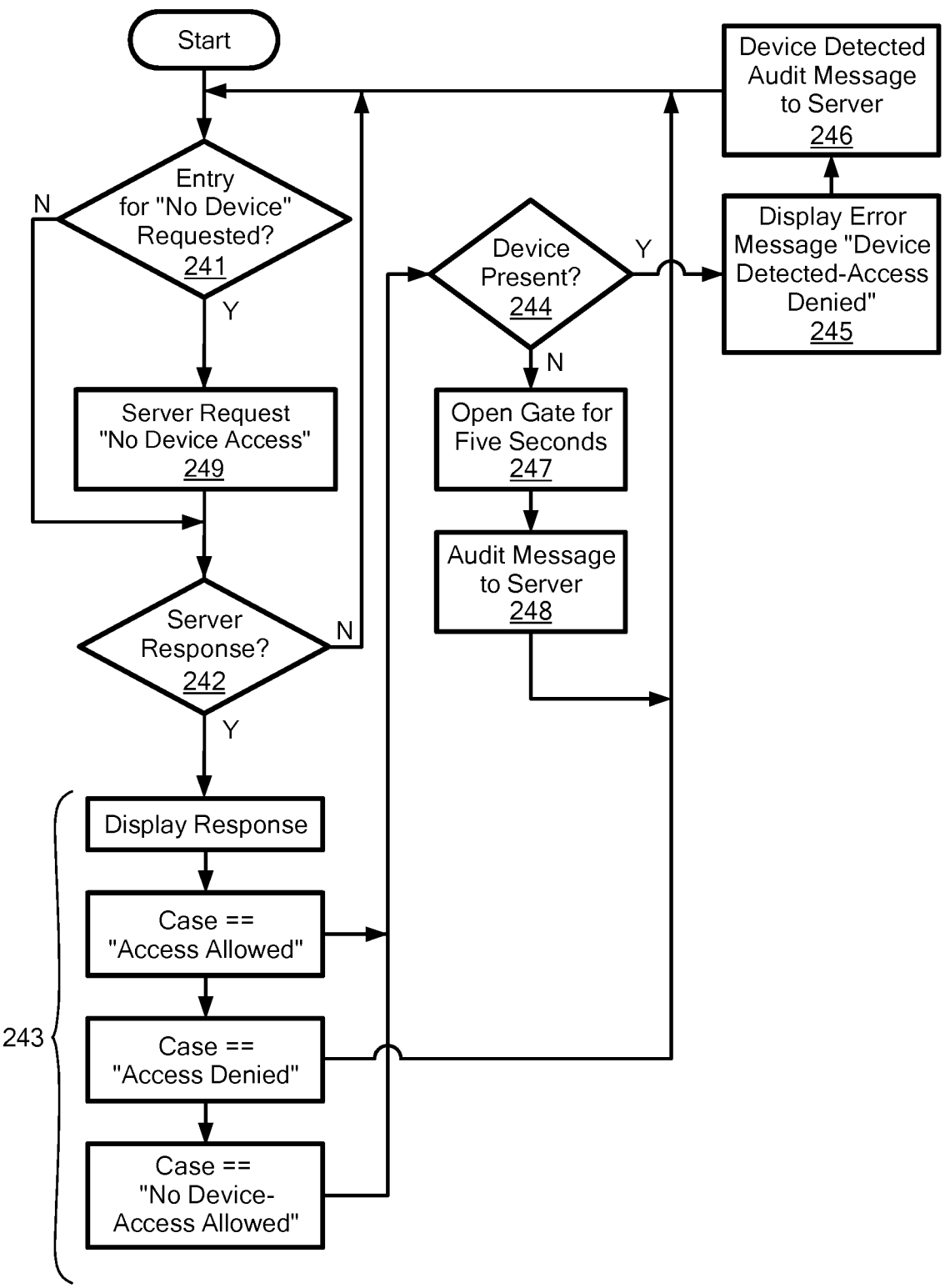
FIG. 14 depicts the process at the Automated Authorization Device in the example case of an Online, Unsupervised Entry/Exit (FIG. 2).

The detailed steps for the Online Unsupervised Entry are shown in FIGS. 12, 13 and 14:

The Mobile Device App steps of FIG. 12 include:

Step 221—when closely proximate the facility entrance/exit, Scan the Location QR code displayed on the Automated Authorization Device 161 (note: QR code includes a one time use transaction ID and is specific to this location). In step 222, the Mobile Device Holder PIN for multifactor authentication (MFA) is retrieved. Step 223—Using an encryption key unique to this device, securely Send QR code Data, Device ID and User credentials (PIN) to Server 162 to request Access at this location. In step 224, the Server 162 response is displayed.

The Server processing of steps in FIG. 13 include:

Step 231® Check if there is a Server Request, and if yes to step 232. Step 232—If there is a Request for Mobile Device Access if yes Step 233, else Step 230. Step 233—If QR valid step 234 else step 238. Step 234—Process QR code to get location, Step 235—Check PIN corresponds with Device ID and if Valid go to step 236 else step 238. Step 236—Check that this device has access at the location, if yes step 237 else step 238. Step 237—Set response "Access Allowed" and go to step 239. Step 238—Set response to "Access Denied". Step 239—send response to Mobile Device 160 and Automated Authorization Device 161, Step 239—log response in Audit Trail and go to step 231. At step 230, a check is made for a request for Entry/exit with No Device. If Yes step 2302 else step 231. Step 2302—set response to "No Device—Access Allowed" and Send the Response to the Authorization Device and go to step 2301. Step 2301—Log Response in Audit Trail, go to step 231.

The Automated Authorization Device Steps of FIG. 14 include:

Step 241—Check if a "No Device" Access Request has been made, if Yes Step 249 else Step 242. Step 249—make Request to Server for "No Device" Access and go to Step 242. Step 242—If there is a Server Response Step 243 else Step 241. Step 243—Display Response and if a Server Response of "Access Allowed" go to Step 244 else if A Server Response of "Access Denied" go to Step 241 else If the Server Response of "No Device-Access Allowed" go to Step 244. Step 244—If a Device is present in Device Detector 163 Then Step 245 else Step 247. At step 245, display an error Message "Device Detected-Access Denied". Step 246—Send "Device Detected—Access Denied"Audit Ms g to Server and go to step 241. Step 247—Open Gate for 5 seconds. Step 248—send "Gate Opened "Audit Msg to Server and go to Step 241.

In one preferred embodiment, there are five primary steps, namely, account set-up, installation, registration, authorization, and use.

During account set-up, an on-line account is created for each facility and each account preferably has a unique location identifier. Bluetooth readers (e.g., wireless location devices) each have a unique identifier and are registered with the account There is typically at least one reader assigned to each security checkpoint in a facility. The persons responsible for the account register the application on their phone and the processing automatically adds the persons to the account and adds a unique, valid e-mail for each person and promotes them to account manager. These persons then receive an e-mail with instructions for completing their account manager set-up.

During installation, the readers are installed within Bluetooth range at the various security checkpoints.

During registration, all users including security guards or other personnel responsible for allowing users to pass different security checkpoints download the application, for example, from the Google Play Store or the ITunes App Store and install the application. Herein, the security guard mobile device is deemed a mobile authorization device. The users register their phones or other mobile device with the application by providing a user name, a phone number, and an optional user identifier. Users can request authorization for a specific account using the request access feature in the application and a location identifier for that account.

During authorization, the account manager logs into their on-line account which will have a list of users who have requested access. The account managers then look up users who have registered with the application using the users last name and phone number. The account manager then authorizes the users for one, some, or all of the readers now located at the various checkpoints. The users have to refresh their application when in Wi-Fi or data coverage to receive the authorization to authorize their mobile devices.

In use, a user (e.g., employee) opens his application on his mobile device when at or approximate the security checkpoint. Once the application identifies the reader, it will display a validation screen such as a three character display with a color background. The characters and background color will change periodically. Thus, the reader provides to the application on the mobile device the reader's unique identifier and if the user of the mobile device with the application open thereon has been pre-registered and authorized to pass by that specific reader, the application will then, in response, cause the mobile device to display the three character display with a colored background validation screen or other predetermined validation screen. The security guard user, with his own mobile authorization device, then visually compares the validation screen on the security guard's mobile device to the validation screen on the user's mobile device who wants to bring their mobile device through the security checkpoint. If the characters and colors match, for example, the user may bring their mobile device through the security checkpoint. If the characters and colors do not match, the user is not allowed to bring their mobile device past the security checkpoint.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A mobile device verification method for a facility, the method comprising:
   the mobile device requesting authorization to permit entry to and/or exit from the facility;
   validating said mobile device request; and
   verifying, as the mobile device enters and exits the facility, that the mobile device is the mobile device whose authorization request was validated;
   and in which verifying includes limiting the distance that one or more of the wireless transactions can be conducted and in which validation further includes comparing a validation screen on the mobile device to the validation screen on an authorization device and allowing the mobile device to enter and/or exit the facility only if the validation screen on the mobile device matches the validation screen on the authorization device.

2. The method of claim 1 in which requesting authorization includes downloading an application to the mobile device, registration of said device, and displaying the validation screen generated by the application when proximate the facility entry and/or exit.

3. The method of claim 2 in which validating said request includes displaying, on the authorization device, the validation screen.

4. The method of claim 1 in which there is no communication between the mobile device and the authorization device.

5. The method of claim 1 in which validation and/or verification includes communication between the mobile device and the authorization device and/or a server.

6. A mobile device verification method for a facility, the method comprising:
   downloading onto the mobile device an application which generates a validation screen which changes over time;
   registering, via the application, the mobile device;
   authorizing the mobile device to pass by a wireless location device having a unique identifier;
   proximate the wireless location device, opening the application on the mobile device and the application wirelessly receiving the unique identifier of the wireless location device;
   in response to receiving the unique identifier of the wireless location device, the application generating a validation screen on the mobile device;
   visually comparing the validation screen on the mobile device with a validation screen on an authorization device;
   allowing the mobile device to pass the wireless location device if the validation screen on the mobile device matches the validation screen on the authorization device; and
   not allowing the mobile device to pass the wireless location device if the validation screen on the mobile devices does not match the validation screen on the authorization device.

7. The method of claim 6 in which the authorization device is a mobile device having the application downloaded thereon and registered and authorized to pass the wireless location device.

8. The method of claim 7 in which the application of the authorization device wirelessly receives the unique identifier of the wireless location device and in response generates a validation screen on the authorized device.

9. The method of claim 6 further including additional wireless location device at different security checkpoints and each wireless location device having a unique identifier.

10. The method of claim 9 in which authorization includes authorizing a mobile device to pass by more than one wireless location device.

11. The method of claim 6 in which registering includes providing a user name and a phone number for the owner of the mobile device.

* * * * *